United States Patent
Claar et al.

[11] Patent Number: 6,047,360
[45] Date of Patent: Apr. 4, 2000

[54] SYSTEM AND METHOD OF ORGANIZING AND DEFRAGMENTING AUDIO EVENTS RECORDED ON A STORAGE MEDIUM

[75] Inventors: Jeffrey Mark Claar, Aliso Viejo; Roger Mather Duvall, Garden Grove; Richard Joseph Oliver, Laguna Beach, all of Calif.

[73] Assignees: Sony Corporation, Tokyo, Japan; Sony Pictures Entertainment, Inc., Culver City, Calif.

[21] Appl. No.: 08/935,478

[22] Filed: Sep. 24, 1997

[51] Int. Cl.[7] ................................................ G06F 12/02
[52] U.S. Cl. ..................... 711/165; 711/105; 711/171; 704/278; 707/206; 709/102; 710/6; 710/52; 710/24; 710/30
[58] Field of Search ............................. 707/206; 711/105, 711/171, 165; 770/52; 704/278; 710/6, 24, 30; 709/102

[56] References Cited

U.S. PATENT DOCUMENTS

| | | |
|---|---|---|
| 4,868,687 | 9/1989 | Penn et al. .................................. 360/13 |
| 5,493,652 | 2/1996 | Koufopavlou et al. .................. 711/170 |
| 5,560,003 | 9/1996 | Nilsen et al. ............................. 707/206 |
| 5,574,907 | 11/1996 | Jernigan, IV et al. .................... 707/200 |
| 5,740,395 | 4/1998 | Wells et al. .............................. 711/103 |
| 5,808,821 | 9/1998 | Davy .......................................... 360/48 |
| 5,829,050 | 10/1998 | Maeda ..................................... 711/171 |

*Primary Examiner*—Hiep T. Nguyen
*Attorney, Agent, or Firm*—Blakely, Sokoloff, Taylor & Zafman LLP

[57] ABSTRACT

The present invention discloses a method for organizing audio events recorded on a storage medium to facilitate efficient storage and fast access. The method comprises the steps of: (1) maintaining attributes of the audio events in a list; (2) determining if a subset of the audio events causes a medium fragmentation based on the attributes, the subset including originally sequential audio segments; (3) if the medium fragmentation occurs, copying the subset of said audio events from the storage medium into a buffer memory of a predetermined size; and (4) copying the buffer memory onto the storage medium.

12 Claims, 5 Drawing Sheets

FIG_2

FIG_4

SYSTEM AND METHOD OF ORGANIZING AND DEFRAGMENTING AUDIO EVENTS RECORDED ON A STORAGE MEDIUM

BACKGROUND OF THE INVENTION

1. Field of the Invention

The present invention relates to disk storage organization. In particular, the present invention relates to efficient disk storage organization of audio data during recording.

2. Description of Related Art

During editing, a track of audio may consist of a few large or many small sequential audio segments (events). These sequential sections are stored onto recording media, e.g., hard disk, in a random order depending on the particular file allocation at the time. When there are many small sequential edited segments, these segments are scattered over the entire disk. During playback, the seek time for these scattered sections increases because of their random location on the disk. The system therefore cannot provide real-time audio during playback.

There are several conventional approaches to the above problem. One approach is merely not to play audio if disk access cannot be completed. This approach leads to random drop-outs in the audio, resulting in unacceptable quality. Another approach is to limit the size of the sections during edit so that small edit, will never occur. This approach severely limits the usability of the system. A third approach is to re-record the affected area to combine the small events into one recording. This approach requires a real-time copy of the audio, leading to unacceptable delays in the recording process.

Accordingly, there is a need in the technology to provide an efficient disk storage organization during recording to reduce playback file access time.

SUMMARY OF THE INVENTION

The present invention discloses a method for organizing audio events recorded on a storage medium to facilitate efficient storage and fast access. The method comprises the steps of: (1) maintaining attributes of the audio events in a list; (2) determining if a subset of the audio events causes a medium fragmentation based on the attributes, the subset including originally sequential audio segments; (3) if the medium fragmentation occurs, copying the subset of said audio events from the storage medium into a buffer memory of a predetermined size; and (4) copying the buffer memory onto the storage medium.

BRIEF DESCRIPTION OF THE DRAWINGS

The features and advantages of the present invention will become apparent from the following detailed description of the present invention in which.

DESCRIPTION OF THE PRESENT INVENTION

The present invention discloses a system and method of organizing audio sections on disk to reduce playback file access time. The system and method keep track of small sections that are scattered on the disk and combine them into blocks of predetermined size. These blocks are then recopied onto the disk. The present invention significantly reduces the access time during playback.

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the represent invention unnecessarily.

Figure 1:
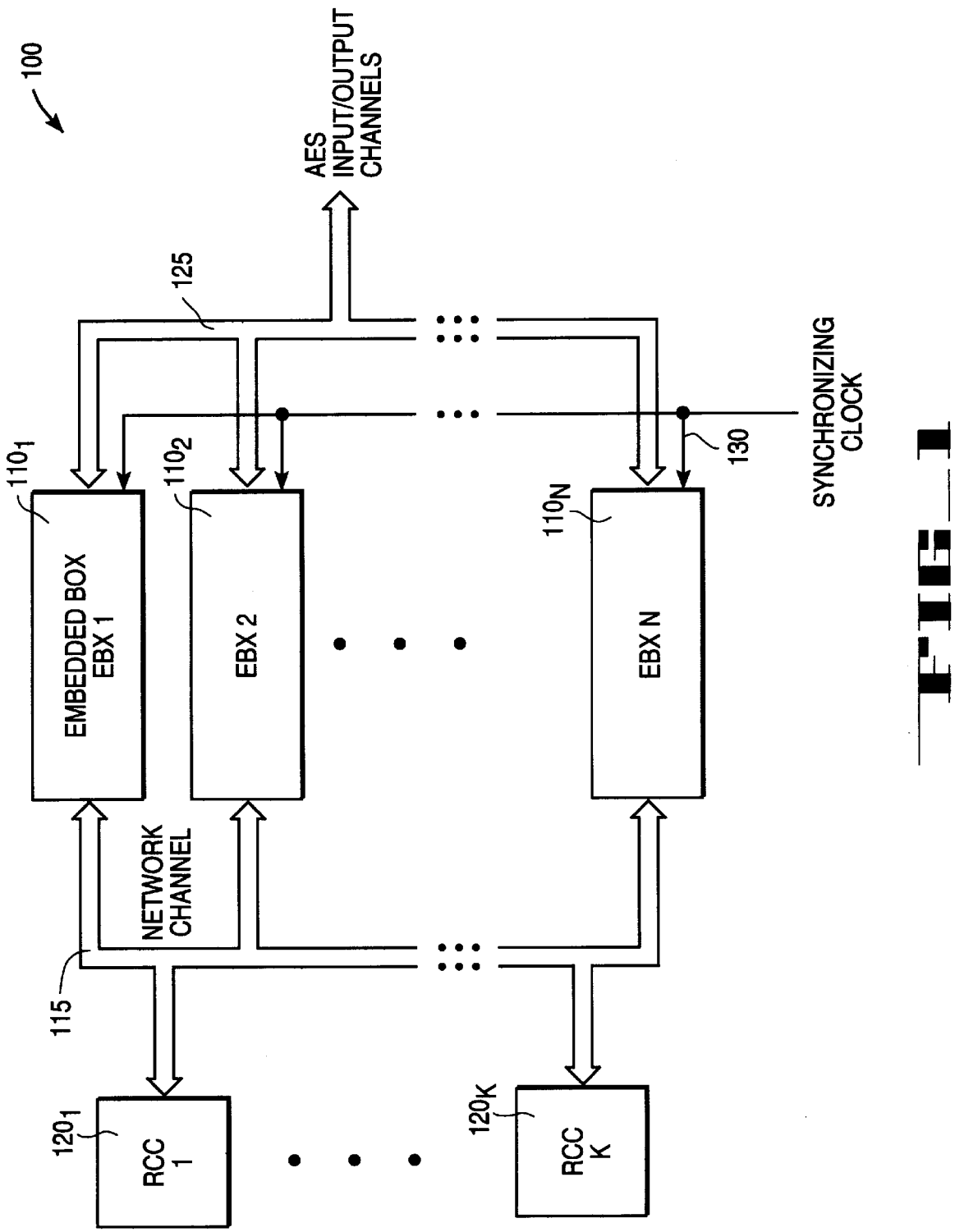
FIG. 1 is a block diagram illustrating an audio system that operates in accordance with the teachings of the present invention.

Referring, to FIG. 1, a block diagram illustrating one embodiment of an audio player/recorder system 100 that operates in accordance to the teaching of the present invention is shown. The system 100 comprises embedded boxes (EBX) EBX1 through EBXN $110_1$ through $110_N$ ("N" being a whole positive number), K remote client computers (RCCs) $120_1$ through $120_K$ ("K" being a positive whole number), network channel 115, audio engineering society (AES) standard input/output channels 125, and synchronizing clock 130.

Each of the EBX $110_1$ through $110_N$ is an audio signal processing system with mass storage. In one embodiment, each EBX consists of a personal computer (PC) system and one or more digital signal processors (DSPs). Other Configurations that provide similar functionalities are also contemplated. Audio sampled data are stored in multiple dynamic random access memory (DRAM) banks. These DRAM banks are accessible to both the host processor of the PC and the DSPs. The details of the EBX architecture will be discussed later.

Each of the RCC's $120_1$ through $120_K$ provides graphical user interface (GUI) to users for sending command and control information to the EBXes $110_1$ through $110_N$ over the network channel 115. Each RCC has two modes of communication to the EBXes: individual addressing and broadcasting. In individual addressing, the RCC issues the command/control information to the specified EBX. The individual address of the destination is encoded as part of the command/control information.

The AES I/O channels 125 consist of 16 audio I/O channels per EBX conforming to the AES standard. The standard is AES 3-1992 and is available from the Audio Engineering Society, Inc., located in New York, N.Y. The synchronizing clock 130 provides a master timing signal for synchronizing all real-time activities of the EBXes $110_1$ through $110_N$.

Figure 2:
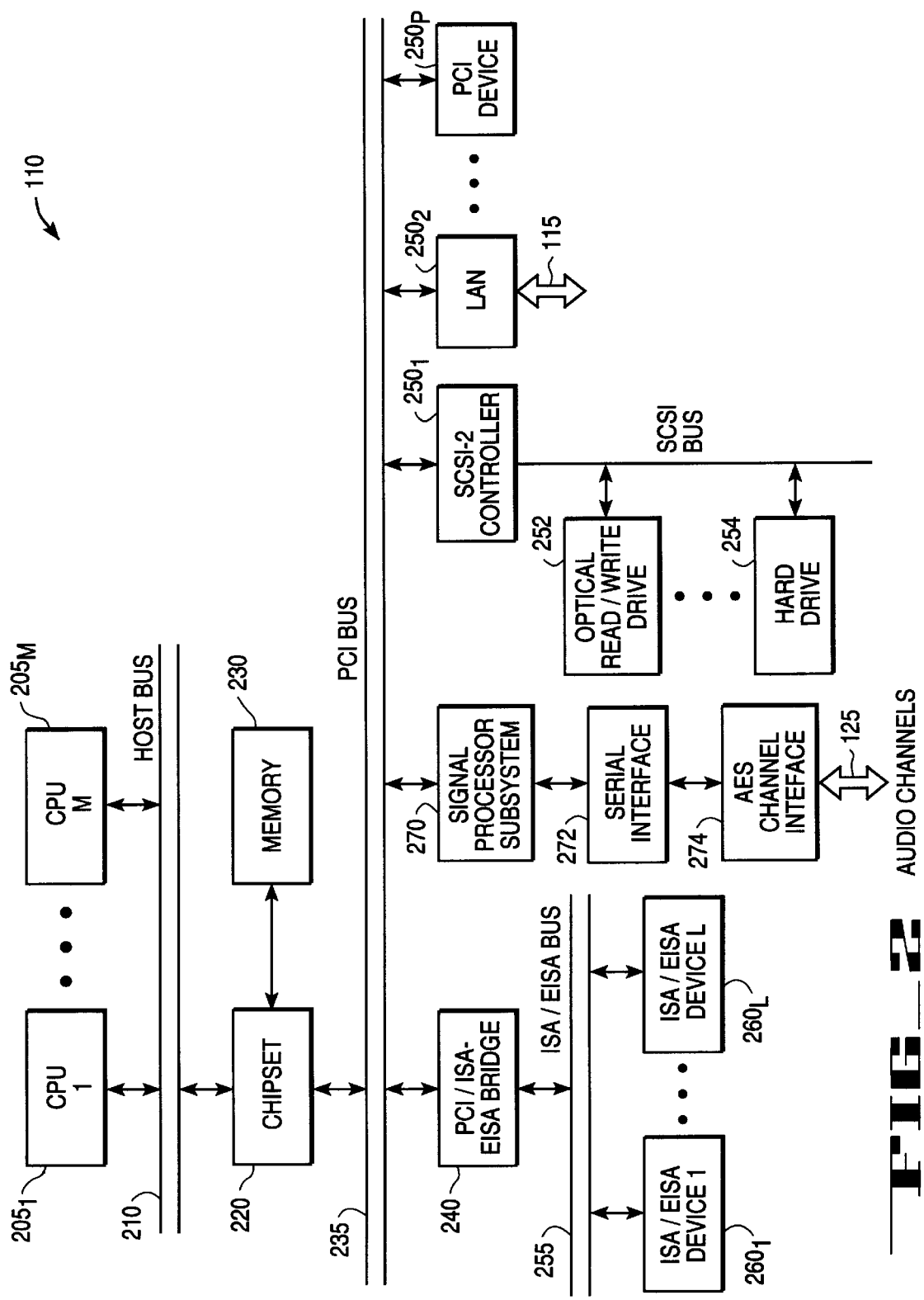
FIG. 2 is a diagram illustrating one embodiment of an embedded box in the audio system.

Referring to FIG. 2, a block diagram illustrating one embodiment of the EBX 110 is shown. The EBX 10 comprises one or more processors $205_1$–$205_M$ ("M" being a positive whole number) and a main memory element 230 (e.g., dynamic random access memory"DRAM", static random access memory"SRAM" etc.) coupled together by a chipset 220. In general, the chipset 220 operates as an interface between a host bus 210 and a peripheral bus 235.

Processors $205_1$–$205_M$ are any microprocessors. In this embodiment, processors $205_1$–$205_N$ are the Pentium® or Pentium Pro® microprocessors manufactured by Intel Corporation at Santa Clara, Calif.

Chipset 220 typically includes cache DRAM controller (CDC), peripheral bus controller, and data path unit (DPU).

The Peripheral Component Interconnect (PCI) Bridge (PB) provides a set of host-to-PCI and PCI-to-host bus transaction translations.

The host bus 210 is a bus that can support transactions to a number of connected processors. Host bus 210 may be referred to as a parallel bus or multiprocessor bus because it supports parallel operations and multiple processors. It is contemplated that host bus 210 operates in a pipelined manner to increase efficiency. However, these features should not be construed to limit the teachings of the present invention. The present invention can be utilized even if there is only one processor connected to the host bus 210, or the host bus 210 is a uniprocessor bus.

The peripheral bus 235 provides a communication path between the processors $205_1$–$205_M$ or main memory element 230 and a plurality of peripheral devices $250_1$–$250_P$ ("P" being a positive whole number). These peripheral devices $250_1$–$250_P$ may include I/O devices such as disk controller $250_1$, local area network (LAN) card $250_2$. In one embodiment, the disk controller $250_1$ is a small computer system interface (SCSI)-2 controller which is interfaced to a number of mass storage devices such as optical read/write drive 252 and hard drive 254, through the SCSI-2 bus. Relevant to the present invention is the signal processing subsystem (SPS) 270 which includes digital signal processors (DSPs), multiple dynamic random access memory (DRAM) banks and PCI bus interface circuits. The SPS 270 has interface to the serial input/output communication device 272 which is connected to the AES I/O channel interface 274. The peripheral bus 235 may include a Peripheral Component Interconnect (PCI) bus or any other type of bus architecture.

The expansion bus 255 provides a communication path between the peripheral bus 235 and a plurality of expansion peripheral devices $260_1$–$260_L$ ("L" being a positive whole number). The expansion bus 255 may include an Industry Standard Architecture (ISA) bus or an Extended Industry Standard Architecture (E.SA) bus.

The PCI-to-ISA/EISA Bridge 240 provides the communication path between the peripheral or PCI bus 235 and the expansion or ISA/EISA bus 255.

During recording, the EBX 110 write the audio data from the AES audio channels on a mass storage medium. The stored data are then organized for efficent access. The organization can be performed by any one of the processors $205_1$ through $205_M$.

Figure 3:
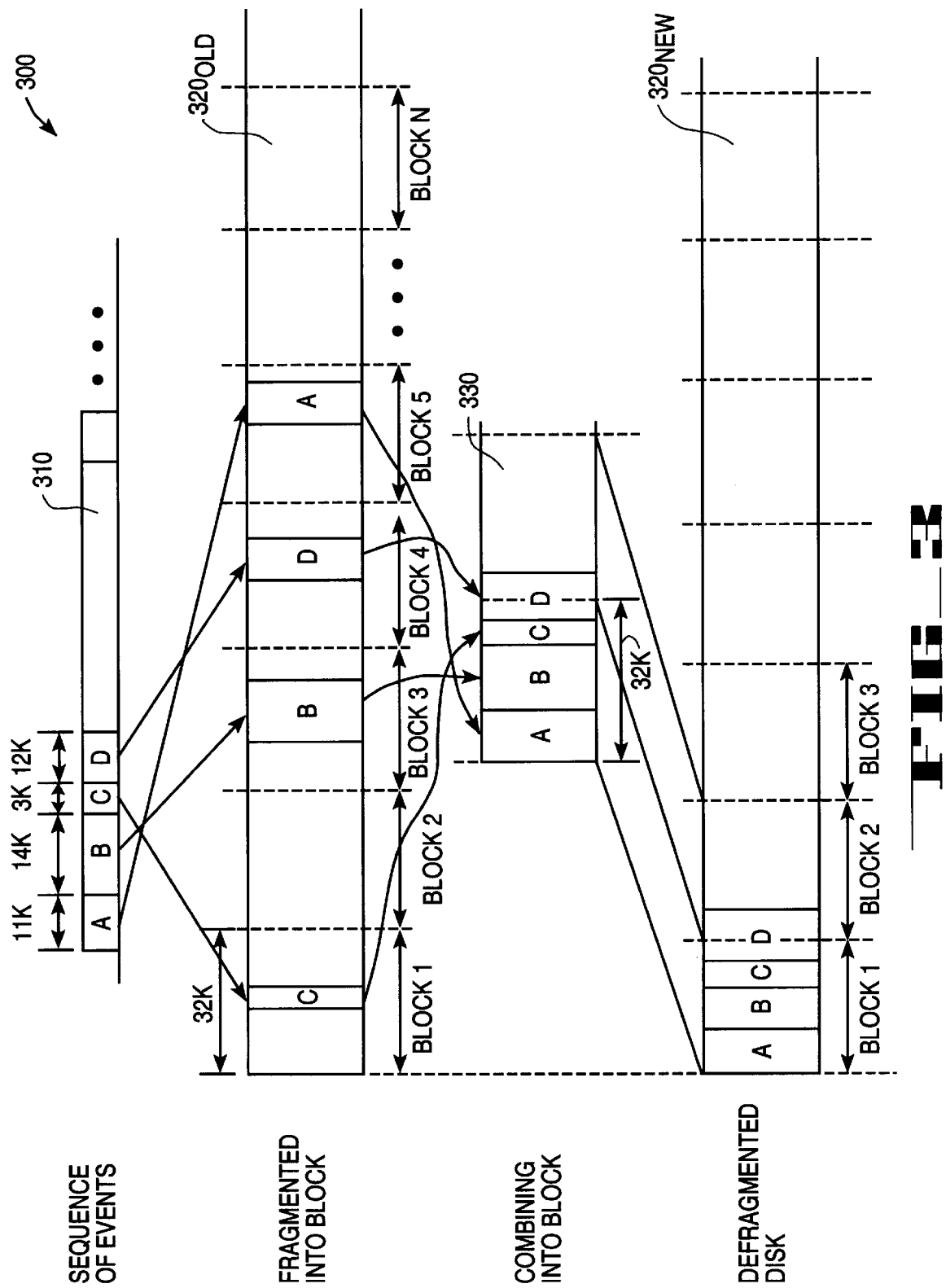
FIG. 3 is a diagram illustrating one embodiment of the process of organizing data via a buffer memory in accordance with the principles of the present invention.

Referring to FIG. 3, a diagram illustrating the organization of stored data in accordance with the teachings of the present invention, is shown. The organization involves a sequence of events 310, a hard disk 320, a buffer memory 330.

The sequence of recording events 310 includes a number of recording events. Each recording event corresponds to an audio segment. The length of the audio segments helps to determine if data re-organization is necessary. If the lengths of the segments are too short, disk fragmentation is likely to result and data re-organization is necessary. In one embodiment, if two or more segments are less than one second in length, and have less than one second of silence between them, then they will be re-organized and disk fragmentation is likely to occur. If the lengths are sufficiently long, no data re-organization is necessary. In one embodiment, a segment length of one second or above is considered sufficiently long and therefore is not marked for re-organization. To keep track of this information, a linked list is created and information about the audio segments is stored in this linked list for later determination. The linked list will be described later.

In this illustrative example, the sequence 310 includes 4 events of different sizes: event A of 11 KB, event B of 14 KB, event C of 3 KB and event D of 12 KB. During recording, these events are written onto the hard disk 320 according to the allocation scheme of the hard disk controller. However, each recording event is assumed to occupy a fixed size of storage regardless of how short the event is. If this fixed size is larger than the size of the recording event, there will be a lot of wasted space or unused area stored on the hard disk. In one embodiment, this fixed size corresponds to 32K samples which is equivalent to approximately two-thirds of a second for a 16-bit audio sampling frequency of 48 KHz.

The hard disk 320 is configured to store these blocks in the order according to the allocation scheme by the hard disk controller. This allocation may result in disk storage fragmentation. In the example in FIG. 3, event A is stored in block 5, event B is stored in block 3, event C is stored in block 1, and event D is stored in block 4. Because these blocks are not stored sequentially in contiguous blocks, at playback time, the input/output time is long and the system cannot provide the real-time processing rate. In addition, the fragmentation of storage also reduces storage efficiency.

The buffer memory 330 is used to re-organize the data in defragmenting the hard disk. In one embodiment, the size of the buffer memory 330 corresponds to 32K samples. In re-organizing the data, the order of the sequential blocks is restored. From the linked list created during the recording, the system extracts event A from block 5 and writes into the buffer memory 330, event B from block 3 and writes into the buffer memory 330 after event A, and so on. After all the events are retrieved in accordance to their original order into the buffer memory 330, the entire buffer memory 330 is then written onto the hard disk 320. The previous storage locations on the hard disk for the blocks containing A, B, C, and D are then erased.

In the example in FIG. 3, the sum of all the storage sizes of the 4 events A, B, C, D exceeds the size of the buffer memory 330. Part of the event D occupies the last portion of the buffer memory 330. In this case, the system may employ another buffer memory and store the portion of event D in the second buffer memory. The first buffer memory 330 is then written onto the hard disk 320. These two buffer memories may then be flip-flopped as one is filled up. Another way is to use only one buffer memory 330 and mark the portion of D that will be read again to be stored next after the current buffer memory is written onto the disk. Yet another way is not to retrieve event D once it is determined that the inclusion of D would overflow the buffer memory 330.

The result is that the events A, B, C, and D are now stored in their original sequential order on the hard disk 320. The hard disk $320_{NEW}$ is defragmented in that the blocks containing events A, B, C, and D are now coalesced into block 1 and part of block 2. The re-organization of data not only frees a large amount of storage of the hard disk 320, but also arranges the recorded events in their original sequential order so that later playback can speed up the disk access.

Figure 4:
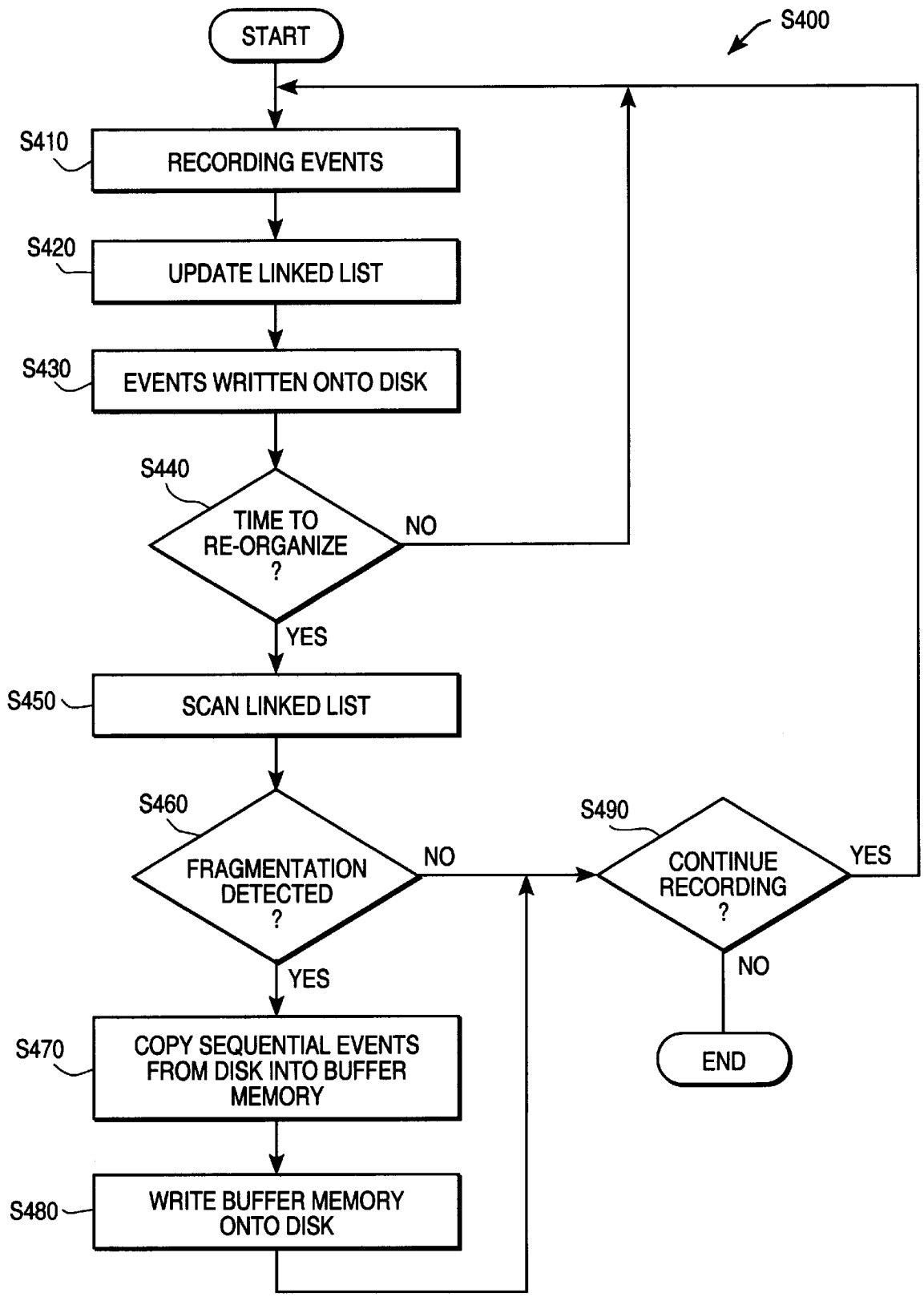
FIG. 4 is a flowchart illustrating one embodiment of a process for re-organizing data, in accordance with the teachings of the present invention.

Referring to FIG. 4, a flowchart illustrating the process S400 to perform the re-organization of data is shown.

At START, the process S400 enters step S410. In step S410, the audio system records the events in real-time as these events are processed by the signal processing subsystem. The process S400 then proceeds to step S420 to update the linked list. The linked list is a data structure that contains information about the recording events. This information includes the length of the audio segments, or alternatively, the number of samples of each segment. Next the process S400 enters the step S430 to record the events onto the hard disk.

The decision step S440 inquires whether it is time for data re-organization. This time may correspond to the time the editing is stopped by the operator. The editing or recording may be stopped when the editing session is over, or sometimes when the operator takes a short break. If it is not time to re-organize data, the process S400 returns to continue recording the audio events. If it is time to re-organize the data, the process S400 proceeds to step S450.

In the step S450, the linked list is scanned and examined if the data written onto the hard disk results in disk fragmentation. The structure of the linked list will be described later. As discussed before, fragmentation is a function of the lengths of the successive segments. The process S400 then proceeds to the decision step S460 to determine if disk fragmentation is detected. If it is determined that there is no disk fragmentation, the process S400 enters the decision step S490. If disk fragmentation is detected, the process S400 enters the step S470 to copy the events that cause fragmentation into the buffer memory. After that, in step S480, the buffer memory is written back to the hard disk. The process S400 then proceeds to the decision step S490.

In the decision step S490, it is determined if recording is continued. If recording is continued, the process S400 returns to step S410 to record the events. Otherwise, the process S400 is terminated.

Figure 5:
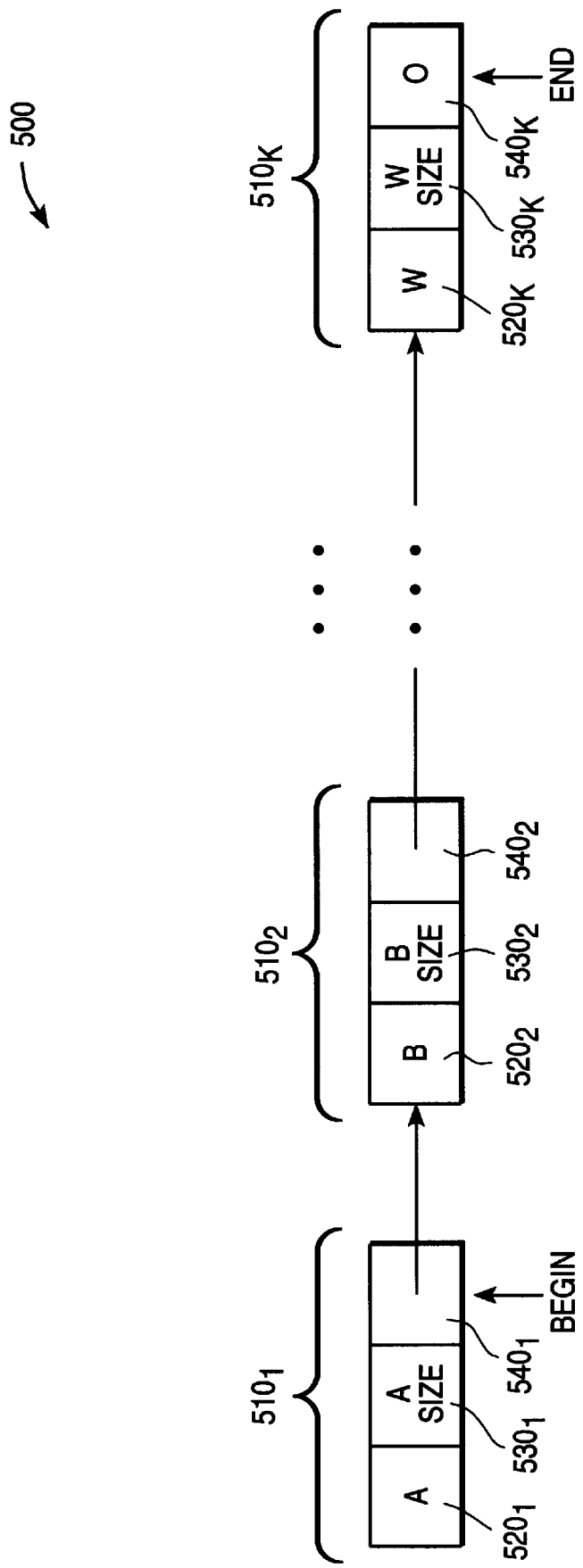
FIG. 5 is a diagram illustrating one embodiment of a linked list used for determining if disk fragmentation occurs.

Referring to FIG. 5, a diagram illustrating one embodiment of the linked list 500 used in step S450 above is shown. The linked list 500 includes K elements $510_1$ through $510_K$. The K elements $510_1$ through $510_K$ represent the data structure that store information on the audio segments 1 through K.

Element $510_1$ has at least three fields: field $520_1$ is the label A which is the label of the audio data segment A, field $530_1$ is the size of the audio data segment A, and field $540_1$ is the link field that points to the next element, element $510_2$. Additional fields may be included as attributes to the corresponding audio segments such as type (e.g., sound, silence).

Similarly, elements $510_2$ through $510_K$ have at least three fields: fields $520_2$ through $520_K$ represent the labels for the corresponding audio data segments, fields $530_2$ through $530_K$ represent the sizes of the corresponding audio data segments, and fields $530_2$ through $530_K$ represent the link fields. Additional fields may be included as attributes to the corresponding audio segments such as type (e.g., sound, silence).

For element $510_K$, the link field $540_K$ is the terminating field.

The size of the audio data segment can be represented by the number of samples, the number of bytes of memory that stores the segment, or the time interval of the audio segment. The size field is one attribute that is used by the system to determine if there is disk fragmentation. Other attributes include the nature or type of the sequence of the audio segments (e.g., sound or silence).

The present invention thus provides efficient data storage on the hard disk and fast disk access during playback because audio segments are organized according to their originally sequential order.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method of organizing a plurality of audio events recorded on a storage medium, the method comprising:

maintaining a list of elements corresponding to the audio events, each element comprising at least one attribute of the corresponding audio event and a pointer to a next sequential audio event;

determining if a subset of said audio events causes medium fragmentation of said storage medium based on the at least one attribute;

if said medium fragmentation occurs, copying said subset of said audio events according to an order indicated by the list from said storage medium into a buffer memory of a predetermined size; and copying said buffered audio events from said buffer memory onto said storage medium.

2. The method of claim 1 wherein determining further comprises:

scanning said list to extract the at least one attribute; and comparing the at least one attribute to a threshold value.

3. The method of claim 2 wherein the at least one attribute includes a length of each of said audio events.

4. The method of claim 2 wherein the at least one attribute includes a type of each of said audio events.

5. The method of claim 4 wherein said type is one of sound and silence.

6. The method of claim 2 wherein said threshold value includes one of a time interval.

7. The method of claim 1 wherein said storage medium is a hard disk.

8. The method of claim 1 wherein said predetermined size corresponds to 32K audio samples.

9. The method of claim 1 wherein said subset includes at least two originally sequential audio segments.

10. A system for organizing a plurality of audio events recorded on a storage medium, said system comprising:

a processing unit coupled to said storage medium for processing said audio events, said processing unit maintaining a list of elements corresponding to the audio events, each element comprising at least one attribute of the corresponding audio event and a pointer to a next sequential audio event, said processing unit identifying a subset of said audio events stored on said storage medium causing a medium fragmentation based on the at least one attribute; and a buffer memory coupled to said processing unit for storing said subset of said audio events, said buffer memory having a predetermined size, said buffered audio events from said buffer memory being copied back to said storage medium according to an order indicated by the list when the medium fragmentation occurs.

11. The system of claim 8 wherein said subset including originally sequential audio segments, each of said audio segments having a length of less than a threshold value corresponding to a time interval.

12. The system of claim 8 wherein said predetermined size corresponds to 32K audio samples.

* * * * *

UNITED STATES PATENT AND TRADEMARK OFFICE
CERTIFICATE OF CORRECTION

PATENT NO.    :    6,047,360
DATED         :    April 4, 2000
INVENTOR(S)   :    Claar et al.

It is certified that error appears in the above-identified patent and that said Letters Patent is hereby corrected as shown below:

In column 1 at line 27 delete the " small edit," and insert --small edits--

In column 2 at line 17 delete "Referring," and insert --Referring--

In column 2 at lines 30-31 delete "Configurations" and insert --configurations--

In column 2 at line 55 delete "10" and insert --110--

Signed and Sealed this

Third Day of April, 2001

NICHOLAS P. GODICI

*Attest:*

*Attesting Officer*    Acting Director of the United States Patent and Trademark Office